United States Patent

Yamakawa et al.

[11] Patent Number: 5,431,434
[45] Date of Patent: Jul. 11, 1995

[54] MODULAR COVER FOR AIR BAG SYSTEM

[75] Inventors: Kazuhiko Yamakawa; Motonobu Kitagawa; Masato Kuretake; Yoshimi Okamoto; Sawayo Uda; Takayasu Zushi, all of Shiga, Japan

[73] Assignee: Takata Corporation, Tokyo, Japan

[21] Appl. No.: 294,822

[22] Filed: Aug. 26, 1994

[51] Int. Cl.$^6$ .............................................. B60R 21/16
[52] U.S. Cl. .............................. 280/728.3; 280/728.1; 280/731
[58] Field of Search ........... 280/728 B, 728 R, 743 R, 280/731, 732; 428/167, 179

[56] References Cited

U.S. PATENT DOCUMENTS

| | | | |
|---|---|---|---|
| 5,060,971 | 10/1991 | Nanbu et al. | 280/728 B |
| 5,172,931 | 12/1992 | Baba et al. | 280/731 X |
| 5,172,932 | 12/1992 | Watanabe et al. | 280/731 |

FOREIGN PATENT DOCUMENTS 0112247  5/1991  Japan ............................ 280/728 B Primary Examiner—Margaret A. Focarino
Assistant Examiner—Christopher Ellis
Attorney, Agent, or Firm—Kanesaka & Takeuchi

[57] ABSTRACT

A modular cover for an air bag system is formed of a rigid inner layer, a soft outer layer, and a tear line along which the modular cover is torn. The tear line includes a raised portion extending from the inner layer into the outer layer, and a recessed portion formed in the inner surface of the modular cover. The modular cover includes projecitons projecting from the inner layer into the outer layer and located adjacent to the tear line so as to prevent the outer layer from suffering from depressions. The projections are formed in a shape such that the their width decreases from an upstream side to a downstream side along a flow direction of the resin when the outer layer is molded.

3 Claims, 4 Drawing Sheets

MODULAR COVER FOR AIR BAG SYSTEM

BACKGROUND OF THE INVENTION

1. Field of the Invention

The present invention relates to an air bag system for inflating an air bag when impact or deformation is sensed in the event of a vehicle collision and more particularly, to a modular cover adapted to accommodate an air bag in the system.

2. Description of the Related Art

A conventional modular cover for use in an air bag system comprises a rigid inner layer 11, and a soft outer layer 12 as illustrated in FIG. 4. The modular cover is provided with a tear line 13 so that the modular cover is torn along the tear line 13 when the air bag is inflated. The modular cover is made by a two-color molding process wherein two resins are separately injected into a common mold.

During the two-color molding process, such a modular cover, composed of the inner and outer layers as shown in FIG. 4, is subject to shrinkage (sink mark or depression) when the resins are cured.

Specifically, depression (shrinkage) results from curing of the outer layer 12 as shown in FIG. 5. FIG. 5 is an enlarged view of a portion V of the modular cover shown in FIG. 4. The depression causes dimples "A" on a surface 12a of the outer layer 12 adjacent to the tear line 13. This deteriorates the appearance of the modular cover. The arrows "B" show the directions in which the material shrinks.

U.S. Pat. No. 5,172,931 for Baba et.al. discloses an modular cover for an air bag system to prevent the outer layer 12 from forming dimples produced by the depression during the molding process of the outer layer 12. The modular cover is provided with projections 14 disposed on the surface of the inner layer 11 which abuts the outer layer 12, adjacent to the tear line 13 so as to prevent the outer layer 12 form forming dimples as shown in FIG. 6.

In the modular cover for an air bag system of Baba et. al., the projections 14 for preventing the outer layer 12 from forming dimples are provided on the surface of the inner layer 11 which abuts the outer layer 12, thereby the shrinkage stress produced during curing of the outer layer 12 is dispersed so as to prevent the outer layer 12 from partly producing the dimples on the surface adjacent to the tear line 13.

According to the modular cover of Baba et.al., when a resin is injected into a mold for the outer layer after curing of the inner layer, each projection 14 becomes an obstacle to the flow S of the resin to produce a turbulent flow "M" at the back of the projection 14 as shown in FIG. 7. FIG. 7 is an enlarged top view of a portion around one of the projections 14. The turbulent flow "M" causes a defective product after curing.

OBJECT AND SUMMARY OF THE INVENTION

It is an object of the present invention to provide a modular cover for an air bag system which can prevent the generation of turbulent flow of the resin at the back of the projection for preventing the formation of dimple and provide a high quality product.

According to the present invention, there is provided a modular cover for an air bag system comprising a rigid inner layer, a soft outer layer, and a tear line, as a lead for tearing, which includes a raised portion formed in the inner layer and extending outwardly from the outer surface of the inner layer and a recessed portion formed in the inner surface of the inner layer. The modular cover is provided with projections projecting from the inner layer into the outer layer and located adjacent to the tear line so as to prevent the outer layer from forming depressions. The projection is formed in a shape such that the width decreases from an upstream side to a downstream side along a flow direction of the resin when the outer layer is molded.

According to the modular cover of the present invention, the resin flows along the outer surface of the projection smoothly, and accordingly the resin flows without turbulence at the back of the projections and a modular cover can be produced with high quality.

BRIEF DESCRIPTION OF THE DRAWINGS

FIGS. 3A and 3B are enlarged views of one of projections of the modular cover for an air bag system shown in FIGS. 1 and 2, in which FIG. 3A is a perspective view and FIG. 3B is a top view;

FIGS. 8A and 8B show an embodiment of the projection according to the present invention, in which FIG. 8A is a perspective view and FIG. 8B is a top view;

FIGS. 9A and 9B show an embodiment of the projection according to the present invention, in which FIG. 9A is a perspective view and FIG. 9B is a top view; and FIGS. 10A and 10B show an embodiment of the projection according to the present invention, in which FIG. 10A is a perspective view and FIG. 10B is a top view.

DESCRIPTION OF THE PREFERRED EMBODIMENTS

Embodiments of a modular cover according to the present invention will now be described referring to attached drawings.

Figure 1:
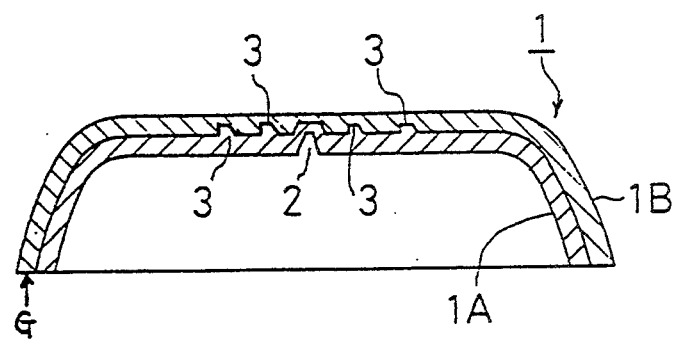
FIG. 1 is a sectional view of a modular cover for an air bag according to one embodiment of the present invention.
Figure 2:
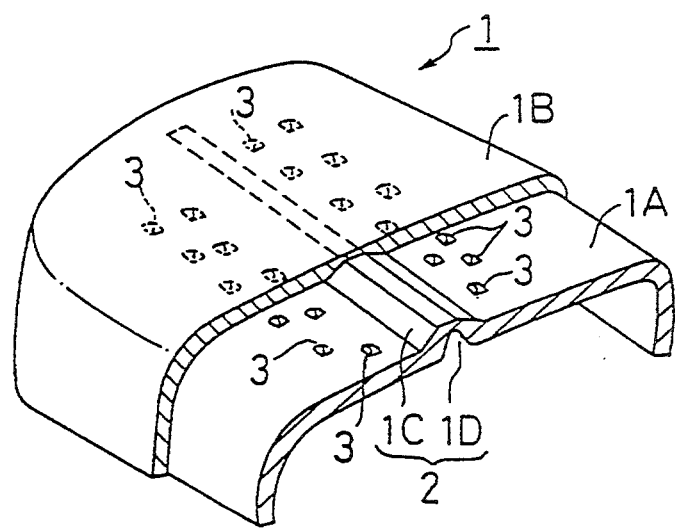
FIG. 2 is a perspective view, partly in section, of the modular cover shown in FIG. 1.
Figure 3:
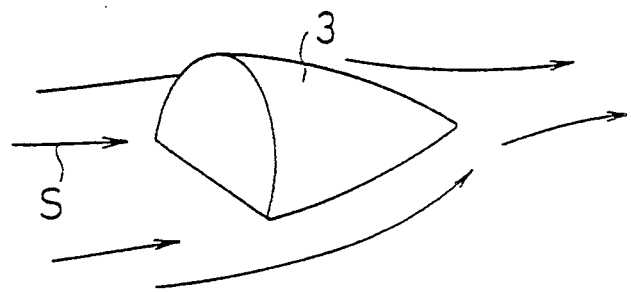
Figure 3:
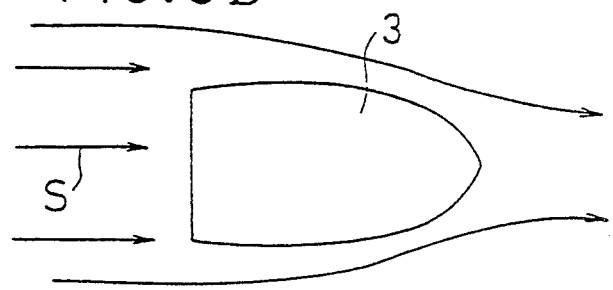
Figure 4:
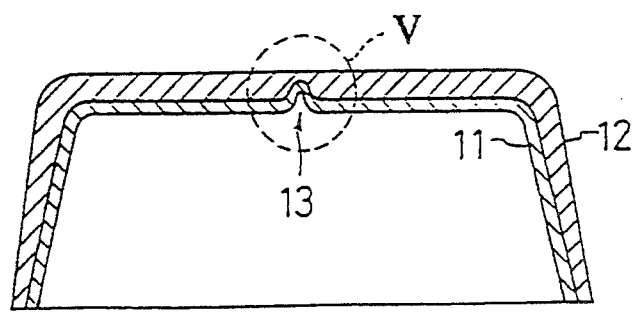
FIG. 4 is a sectional view showing a conventional modular cover.
Figure 5:
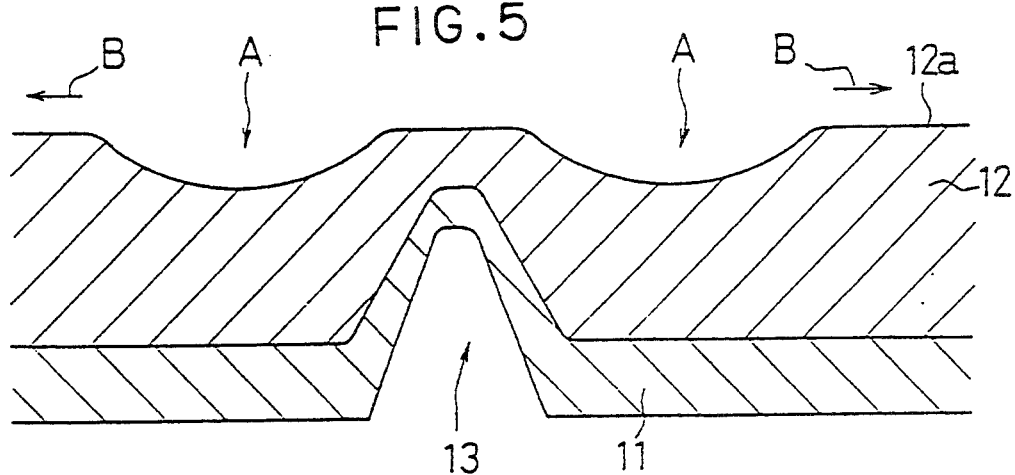
FIG. 5 is an enlarged view of a portion V shown in FIG. 4.
Figure 6:
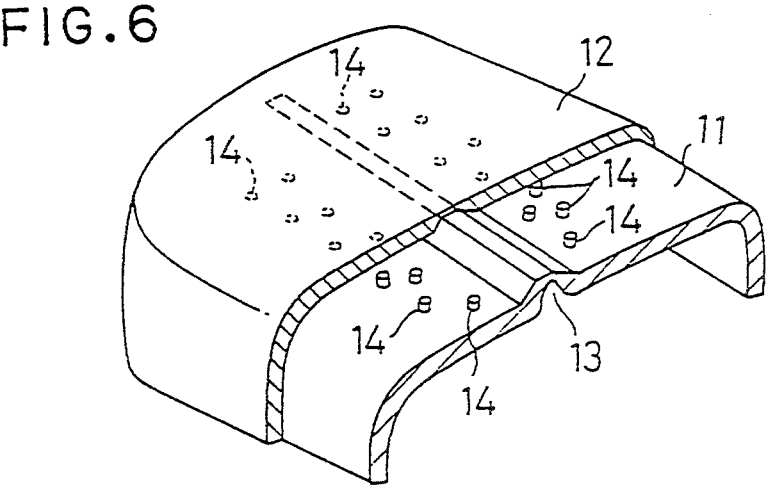
FIG. 6 is a perspective view, partly in section, of a modular cover of the prior application.
Figure 7:
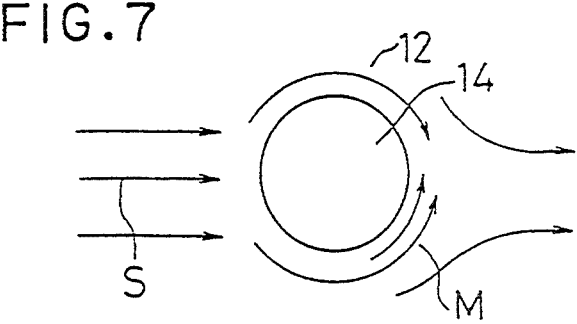
FIG. 7 is an enlarged view of a portion around one of the projections of the modular cover of the prior application.

Referring to FIGS. 1 to 3, a modular cover 1 includes a rigid inner layer 1A and a soft outer layer 1B. The modular cover 1 is provided with a tear line 2 as a lead for tearing so that the modular cover 1 is torn along the tear line 2. The tear line 2 comprises a raised portion 1C extending from the inner layer 1A into the outer layer 1B, and a recessed portion 1D formed in the inner surface of the modular cover 1.

A number of projections 3 are formed on the surface of the inner layer 1A adjacent to the tear line 2 so as to prevent the outer layer 1B from forming depressions.

Each of the projections 3 for preventing the formation of depressions is formed in a streamlined shape, wherein the width decreases from an upstream side to a downstream side along a flow direction of the resin when the outer layer 1B is molded. In FIG. 1, the mark "G" designates a position of an inlet for injecting the resin for molding the outer layer 1B.

The resin for the outer layer 1B flows along an outer surface of the projections 3 smoothly so that the resin flows without turbulence along the projection 3 as shown by arrows S in FIG. 3.

The projections 3 dissipate stress due to shrinkage which may occur when the ouer layer is cured. This prevents depressions on the outer layer 1B.

Figure 8:
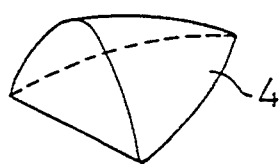
Figure 8:
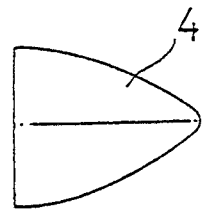
Figure 9:
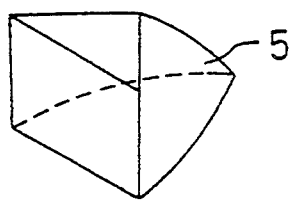
Figure 9:
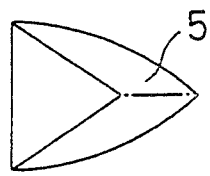
Figure 10:
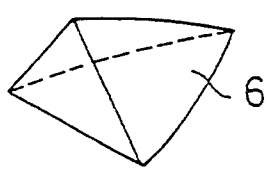
Figure 10:
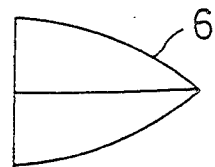

It is not essential in the present invention that the projection is in the shape as shown in FIGS. 1 to 3. The projections may be formed in a shape of projections 4, 5, or 6 as shown in FIGS. 8A to 10B or other shape. FIGS. 8A, 9A and 10A are perspective views and FIGS. 8B, 9B and 10B are top views.

As described above, according to the present invention, the modular cover for an air bag system is prevented from forming depressions produced during curing of the outer layer and prevented from generating a turbulent flow of the resin so that the resin flows within the mold smoothly thereby a high quality product is effectively produced.

What is claimed is:

1. A modular cover for an air bag comprising:
   a rigid inner layer having outer and inner surfaces,
   a soft outer layer directly molded over the outer surface of the inner layer and having a smooth outer surface without depressions,
   a tear line formed in the inner and outer layers for tearing the modular cover when the air bag is extended, said tear line being formed of a raised portion formed in the inner layer and extending outwardly from the outer surface of the inner layer, a recessed portion formed in the raised portion and extending toward the outer layer from the inner surface of the inner layer, and a thin portion formed in the outer layer and located above the raised portion, and
   a plurality of projections integrally formed with the inner layer to extend outwardly from the outer surface thereof and to engage the outer layer, said projections being located near and along the tear line so that when the outer layer is molded and cured, a portion near the tear line does not partly shrink to thereby substantially form a smooth surface without forming a depression along the tear line, and each projection being formed in a shape such that a width of the projection decreases gradually from an upstream side to a downstream side along a flow direction of a resin when the outer layer is molded.

2. A modular cover according to claim 1, wherein each of said projections has a height less than a thickness of the outer layer so that when the outer layer is molded and cured, the projections dissipate stress of the outer layer near the tear line due to shrinkage to thereby substantially form the flat outer surface without forming depressions along the tear line.

3. A modular cover according to claim 1, wherein each of said projections is formed in a streamlined shape so that the resin for said outer layer flows along the outer surface of the projections smoothly, whereby no turbulent flow is produced at a back of the projeciton.

* * * * *